United States Patent [19]

Doty

[11] 4,002,231
[45] Jan. 11, 1976

[54] LOAD TRANSFER MECHANISM AND JAM PREVENTING CONTROLS FOR A VERTICAL SHELF CONVEYOR

[75] Inventor: Verle L. Doty, Harrison, Ohio

[73] Assignee: Kornylak Corporation, Hamilton, Ohio

[22] Filed: Oct. 17, 1974

[21] Appl. No.: 515,676

[52] U.S. Cl. .............................. 198/483; 198/796; 198/856; 187/98
[51] Int. Cl.² ........................................ B65G 43/00
[58] Field of Search ............. 198/40, 154, 156–158, 198/232; 187/98; 214/95 R, 128, 16 B, 16.4 R

[56] References Cited

UNITED STATES PATENTS

| 1,057,556 | 4/1913 | Joor .................................... 198/157 |
| 1,910,965 | 5/1933 | Regan ................................. 198/156 |
| 1,977,732 | 10/1934 | Mattler ............................... 198/232 |
| 3,365,052 | 1/1968 | Kornylak ........................... 198/158 |
| 3,393,814 | 7/1968 | Atwater ......................... 214/16.4 R |
| 3,593,862 | 7/1971 | Pierson et al. ..................... 198/157 |

FOREIGN PATENTS OR APPLICATIONS

| 143,675 | 6/1920 | United Kingdom ................. 187/98 |

Primary Examiner—Johnny D. Cherry
Assistant Examiner—Joseph E. Valenza
Attorney, Agent, or Firm—Beall & Jeffery

[57] ABSTRACT

A conveyor having generally horizontal shelves traveling vertically within a casing between load transferring stations provided with openings in the casing and transfer means at a load transfer station is characterized by a safety cable adjacent the upper portion of the opening to be in the path of only a misplaced article for deflection and actuation of a switch to turn off the driving electric motor and thus preventing jamming of the article between the upwardly moving shelf and casing. Further, the transfer mechanism is provided with transfer fingers that interdigitate with shelf fingers so that when the transfer fingers are in a horizontal position and supporting an article, the upwardly moving shelf will pick up the article from the fingers, and control means are provided to sense the transfer fingers in the horizontal position to permit upward travel of the conveyor and prevent downward travel of the conveyor. The transfer fingers are pivotally mounted with radial lost motion and held in an inclined position and vertical storage position by interengaging pins and recesses. In the inclined position, the transfer fingers move downwardly slightly from a biased position upon receiving an article from the downwardly moving shelf to actuate a switch, which with delay will deenergize the driving motor. The delay is sufficient to normally provide for the complete transfer of the article through the transfer opening by sliding down the inclined transfer fingers through the action of gravity.

30 Claims, 8 Drawing Figures

LOAD TRANSFER MECHANISM AND JAM PREVENTING CONTROLS FOR A VERTICAL SHELF CONVEYOR

BACKGROUND OF THE INVENTION

Shelf conveyors that move vertically within a casing between transferring stations that have transferring openings are well known, but there are considerable problems with respect to improperly transferred articles that may jam between an upwardly moving shelf and the casing, improperly removed articles from a downwardly moving shelf that may remain long enough to be jammed by the next downwardly moving shelf, and operation of a conveyor in the wrong direction to jam an article on a transferred device by a downwardly moving shelf when in fact shelves should be moving upwardly to pick up the article from the transfer device. Further, transfer devices with abutment arms have assembly and adjustment difficulties with respect to the various transfer positions and storage positions when they are not needed.

SUMMARY OF THE INVENTION

It is an object of the present invention to overcome the above difficulties with respect to material handling conveyors of the type wherein horizontal shelves move vertically between load transferring stations within a casing having transferring openings in its side at the stations.

A cable placed adjacent the upper portion of a transferring opening is provided in such a position to only be deflected by an improperly placed article that would otherwise jam between an upwardly moving shelf and the transferring opening, so that such deflection will operate a switch and shut off the conveyor in time for removal of the article without jamming. Further, when it is intended to pick up an article from transfer fingers by interdigitating shelf fingers moving upwardly, automatic switch controls are provided to sense the transfer fingers in the horizontal pick up positon to prevent operation of the conveyor to move the shelves downwardly and thus prevent the jamming of an article between the horizontal pick up fingers and the downwardly moving shelf.

When the interdigitating transfer fingers are in an inclined positon to receive an article from the downwardly moving shelf fingers, the transfer fingers are provided with limited pivotal movement to actuate an automatic control circuit that will deactivate the driving motor after a predetermined delay, which delay is normally sufficient to complete the transfer.

The transfer fingers are held in their inclined positon and a vertical storage position removed from the path of travel of articles on the conveyor shelves by means of a lost motion pivotal connection, which pivoting will permit movement of the fingers between their horizontal, inclined and vertical positions, and which radial lost motion will permit engagement and disengagement of pins and recesses that will lock the shelves in their inclined and vertical positions.

BRIEF DESCRIPTION OF THE DRAWING

Further objects, features and advantages of the present invention will become more clear from the following detailed description of a preferred embodiment of the present invention as shown in the accompanying drawing, wherein.

DETAILED DESCRIPTION OF THE PREFERRED EMBODIMENT

Figure 1:
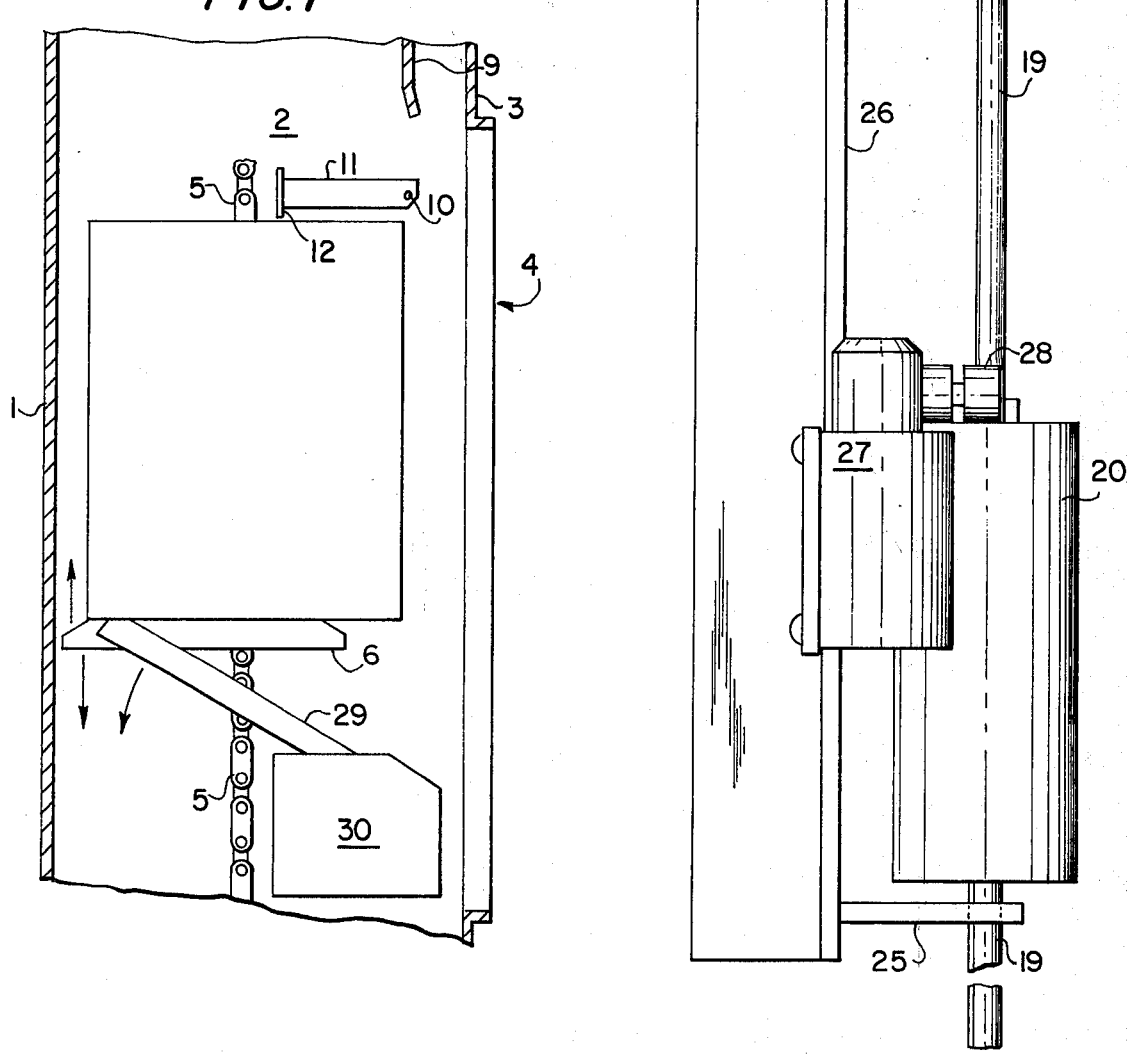
FIG. 1 is a somewhat schematic side elevation view, with the casing in cross section, of a vertically moving shelf conveyor having the control mechanism and transfer mechanism of the present invention.

As shown in FIG. 1, the casing 1, which may be of generally vertical axis tubular shape, particularly with a rectangular horizontal cross section, is shown with a rear wall to the left of FIG. 1, a right side wall 2, an opposite side wall (not shown), a front wall 3, and a transfer opening or door 4 in the front wall 3 at a transfer station. A chain 5 extends through generally the central portion of the casing 1 and at its top and bottom travel around respective sprockets (not shown), which may be driven by an electric motor (not shown) to travel in an endless path. A plurality of generally horizontal shelves 6 are mounted on the chain 5 for traveling vertically upwardly and downwardly as shown by the arrows according to the direction of drive of the chain 5 for corresponding transporting articles carried by the shelves 6 between transferring stations.

Figure 6:
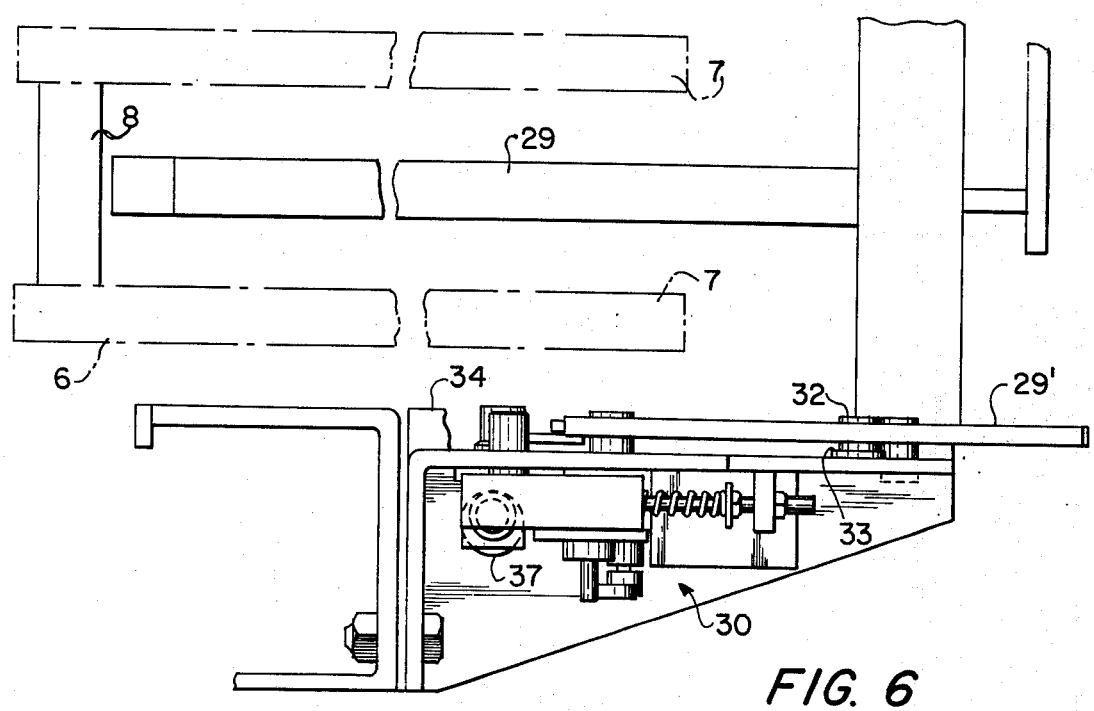
FIG. 6 is a top view of the transfer mechanism of FIG. 3, with a portion of the shelf fingers being shown for reference.

As more clearly shown in FIG. 6, each of the shelves 6 is constructed of a plurality of parallel rigid fingers 7 that are rigidly interconnected at their rearward end by a cross member 8, so that they are cantilevered towards the transfer opening 4.

All of the above specifically described structure is conventional and shown in the Kornylak U.S. Pat. No. 3,365,052 issued Jan. 23, 1968. Further details of this conventional structure will not be shown so as to concentrate on the improvements of the present invention, and for such details, reference may be made to the above mentioned patent, the disclosure of which is incorporated herein in its entirety for background material.

As shown in FIG. 1, the casing may or may not be provided with a guide plate 9 for defining the forward most portion of the path of travel for articles moving within the casing. If the guide plate 9 is present, it is seen that improperly transferred articles which extend too far forwardly on the shelves 6 would strike the guide plate 9 during upward movement of the shelf 6 and jam between the shelf 6 and the guide plate 9. If the guide plate 9 was not provided so that forward guiding would be provided by the forward wall 3 of the casing itself, it is seen that improperly transferred articles that would be too far forward would jam between the upper portion of the opening 4, that is the casing wall 3, and the upwardly moving shelf 6. Either type of jamming could cause serious injury to either the conveyor mechanism or the article, or both and be very difficult to correct.

Figure 2:
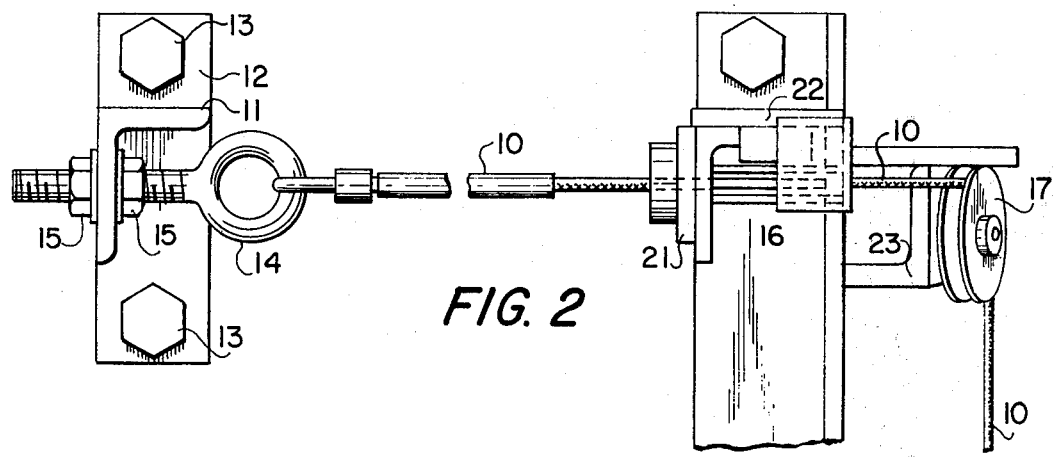
FIG. 2 is an elevation view, taken from the rear of the casing, that is to the left, of FIG. 1, with portions broken away, showing only the cable jam preventing control.

According to the present invention, a cable 10 is placed horizontally and parallel to the plane of the opening 4 and the plane of the front wall 3 adjacent the upper portion of the opening 4 to be positioned such that it will engage an improperly transferred article as defined above, but not engage an article that has been transferred sufficiently rearwardly on the shelf 6 so as to not jam during upward movement with either the casing wall 3 or guide plate 9. As shown in FIGS. 1 and 2, one end of the cable 10 is secured on the outer end of an arm 11 that has its opposite end fixed to a bracket 12 secured by bolts 13 to the side wall 2 of the casing. The attachment of the end of the cable 10 to the arm 11 is accomplished by means of an eye-bolt 14 having a threaded shaft adjustably secured by means of nuts 15 within an aperture in the outer end of the arm 11, which adjustment is for purposes of adjusting the degree of deflection of the cable 10 necessary to operate the safety mechanism as will be described more fully hereafter.

The horizontal portion of the cable 10 that will be struck and deflected by an upwardly moving improperly transferred article has its opposite end adjacent the side wall opposite the side wall 2 guided around a pulley 17 so that the end of the cable 10 opposite from the end secured to the bolt 14 will extend vertically downwardly where it is secured at 18 to a vertically elongated rod 19 having fixedly mounted thereon and between its opposite ends a weight 20. It is seen that the weight 20 and pulley 17 will bias the horizontal portion of the cable 10 tightly in its indicated position.

To prevent the cable 10 from becoming disengaged with the pulley 17 when struck by an upwardly moving article that has been improperly transferred, a bearing aperture 21 is provided closely adjacent the pulley 17. A mounting member 16, which is attached to the casing side wall opposite from the wall 2 mounts a bracket 22 holding the guide aperture 21 and further mounts a bracket 23 rotatably mounting the pulley 17. Guide plates 24 and 25 have apertures in their right hand portions, as seen in FIG. 2, for receiving therethrough respectively the upper and lower portions of the elongated rod 19, and are secured at their left hand portions to a flange 26 of the mounting 16. It is thus seen that the guide plates 24 and 25 determine the maximum vertical range of movement of the weight 20, which is of a greater diameter than the apertures receiving therein the ends of the rod 19.

A switch 27 is secured to the flange 26, and has a switch acutating arm with a roller 28 at its outer end normally entending within the vertical path of movement of the weight 20. In the position shown in FIG. 2, the switch 27 is in its normal position, which is preferably closed, so that when an improperly transferred article strikes and deflects the cable horizontal portion 10, the vertical portion of the cable 10 will lift the rod 19 and weight 20 carried thereby so as to immediately actuate the switch 27 to its open position, which will deenergize the conveyor driving motor and stop the conveyor. The conveyor will not stop immediately due to inertia over travel, so that the guide plate 24 is provided a considerable distance above the switch 27 to permit such further upward travel of the weight 20, and correspondingly, the lower end of the rod 19 is lengthen so that it will not be removed from the guide aperture within the guide plate 25 during such over travel. Further, the vertical portion of the cable 10 is sufficiently long to provide for such over travel before the connector 18 engages the pulley 17. The over travel is further provided for by locating the cable 10 sufficiently below the guide plate 9 or top of transferring opening 4 a distance such that the conveyor will slow down and stop before the article will strike such surfaces of the casing.

The relative position of the switch actuating roller 28 and actuating weight 20 is determined by the previously mentioned threaded adjustment of the bolt 14 and nuts 15, which in turn will determine the sensitivity of the control.

Figure 3:
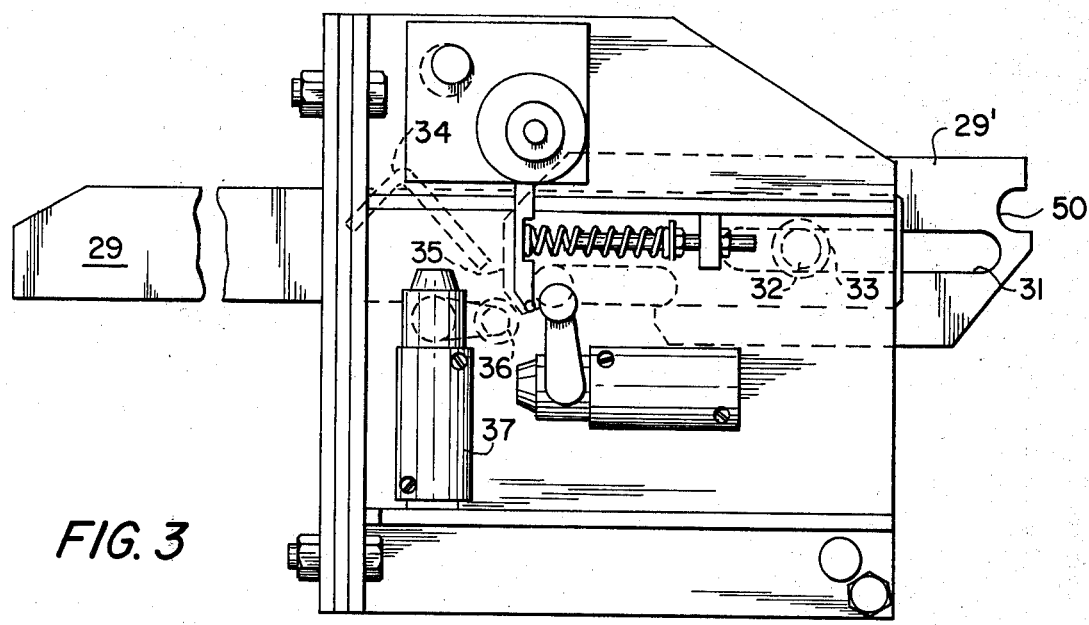
FIG. 3 is a side elevation view of the load transferring mechanism of FIG. 1, with the transfer fingers in their horizontal position.

The load transfer mechanism of the present invention is shown in FIG. 1 with transfer fingers 29 and a control component housing 30. As shown in FIG. 6, the transfer fingers 29 are parallel to each other (although only one is shown) and interdigitate with the shelf fingers 7 due to the fact that they are horizontally offset from each other. The transfer fingers 29 are rigid and rigidly interconnected by a cross member at their forward end, which cross member is fixedly secured to a generally vertically extending positon control plate 29'. As shown in FIGS. 3-5, the plate 29' has an elongated slot 31, which is elongated in the direction of the length of the fingers 29. A pivot pin 32 has a mounting 33 to be fixedly secured to the casing, and further extends within the elongated slot 31 to establish a pivot axis for the transfer arms 29, with radial lost motion between the pivot axis and the transfer arms 29.

In the position shown in FIG. 3, the transfer arms are horizontal so that they may support an article to be picked up by an upwardly moving shelf. As shown in FIG. 6, there is a small clearance between the rearward most end of the plurality of identical transfer fingers 29 and the rigid cross member 8 of the shelf as the shelf passes the transfer mechanism. Although the pin 32 and slot 31 connection would provide for further rearward movement of the transfer fingers that would provide for interference with the shelf, such further rearward movement is prevented by an abutment plate 34 that engages the rearward end 35 of the plate 29' before contact could be made between the rearward end of the transfer arms 29 and the cross member 8 of the shelves. The lower portion of the rearward most end 35 of the plate 29' is tapered to provide a cam surface for engaging a switch actuating lever roller 36 when the transfer fingers are in the horizontal position. The switch actuating arm carrying the roller 36 will operate the switch 37 to sense the horizontal position of the transfer fingers 29. This information is to prevent downward movement of the conveyor when the transfer fingers are in the horizontal position, so as to prevent the jamming of an article supported by the transfer fingers between a downwardly moving shelf and the transfer fingers.

Figure 4A:
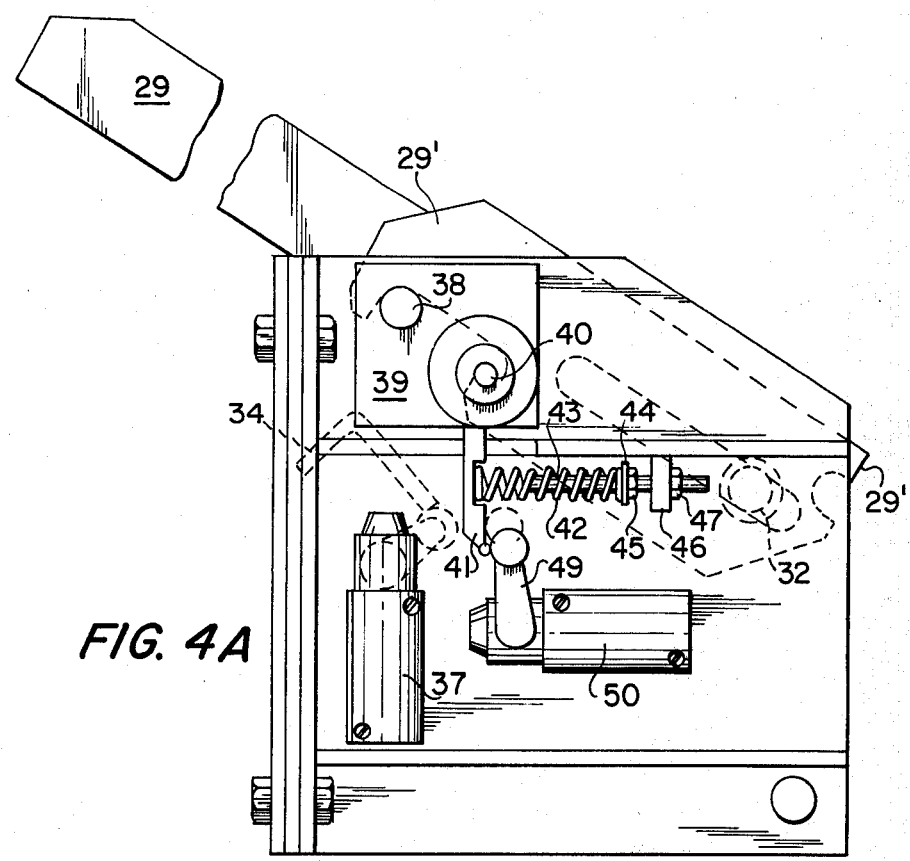
FIG. 4A is a side elevation view of the transfer mechanism as shown in FIG. 1 with the transfer fingers in their inclined positions prior to the reception of an article.
Figure 4B:
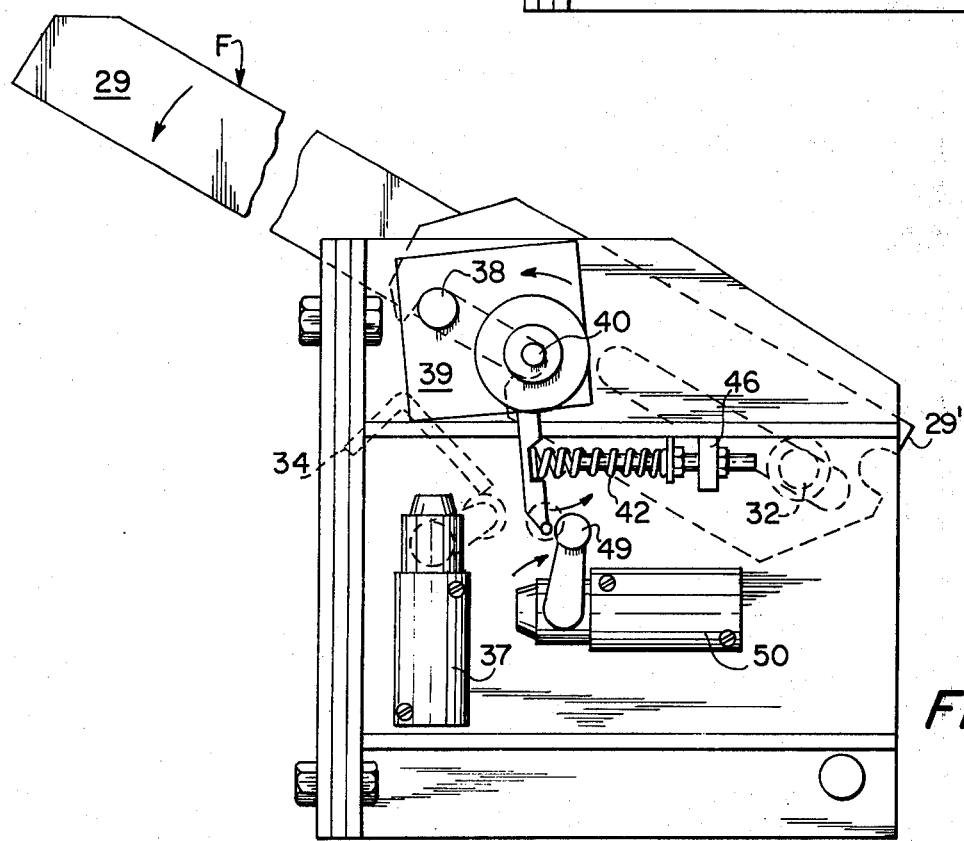
FIG. 4B is a view corresponding to FIG. 4A, but with the transfer fingers pivoted downwardly slightly due to the reception of an article on the transfer fingers.
Figure 5:
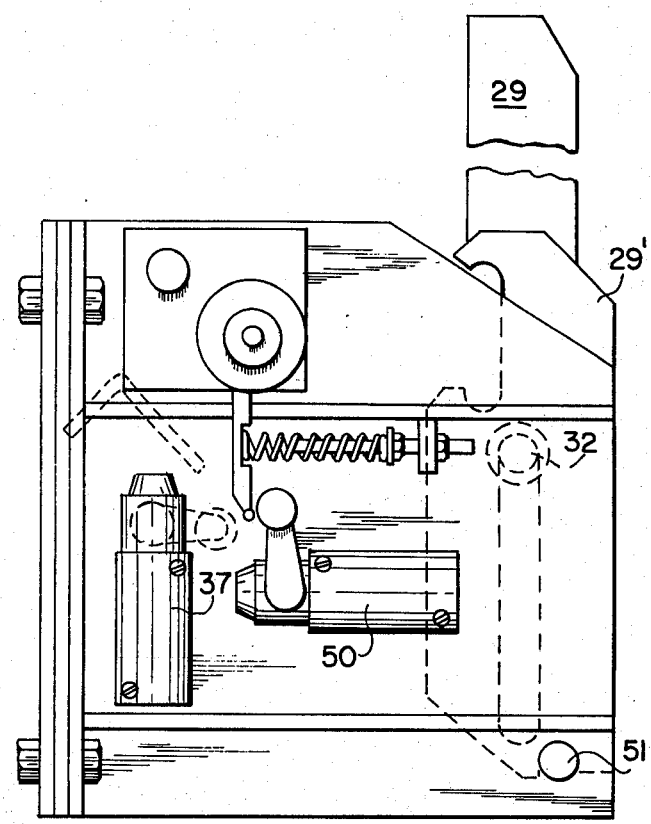
FIG. 5 is a side elevation view of the transfer fingers as shown in FIG. 1, but with the transfer fingers in their vertical storage position.

In FIG. 4A, the transfer fingers are in an inclined position ready to receive and transfer an article from a downwardly moving conveyor shelf, and in FIG. 4B, the transfer fingers 29 have engaged the article, so that the weight of the article produces a downward force F on the transfer fingers 29 to rotate the transfer fingers in the direction of the arrow, that is counterclockwise, about the pivot pin 32 which pivoting is used to actuate control means for indicating the presence of an article on the inclined transfer fingers.

In FIGS. 4A and 4B, it is seen that from the position of FIG. 3, the transfer fingers 29 have been rotated in the clockwise direction about the pivot pin 32 until the rearward most end 35 has cleared the forward portion of a pin 38, from which position the transfer fingers were moved rearwardly and upwardly in the direction of their length by the radial lost motion pin 32 and slot 31 connection to where the recess in the lower rearward portion of the plate 29' was moved into alignment with the pin 38, so that the transfer finers could be pivoted counterclockwise to engage the pin 38 with such lower recess. It is seen that in this position of FIG. 4A, the pin 38 and recess connection along with the pin 32 and slot connection 31 fix the position of the fingers 29 due to their weight.

To provide for the limited pivotal movement between FIGS. 4A and 4B, the pin 38 is fixedly secured to a plate member 39, which plate member 39 is pivotally mounted for rotation about a fixed horizontal axis as determined by the pivot pin 40 mounted in the casing structure. The limits of such pivotal movement are determined by the pin 38 extending through an aperture in a stationary member, as shown in FIG. 3 and dotted lines. A control arm 41 is fixedly secured to the lower edge of the control plate 39, for rotation therewith about the pivot pin 40. This arm 41 has a recess receiving therein one end of a coil compression spring 42, which spring 42 is guidingly received on a threaded shaft 43. The threaded shaft 43 is provided with a washer abutment for the other end of the coil spring 42 and a nut 45, that may be threadably moved along the length of the shaft 43 for adjusting the spring tension, and thus the force required (the weight of an article) to move the transfer fingers 29 pivotally from their position of FIG. 4A to the position of FIG. 4B. The shaft 43 is threaded into the threaded bore of a stationary ear 46 and locked into place by means of a lock nut 47. When the transfer fingers 29 pivot downwardly from their position in FIG. 4A to the position in FIG. 4B, the arm 41 will pivot about the pint 40 against the bias of the spring 42 as shown by the arrows in FIG. 4B to rotate the switch actuating arm 49 in the clockwise direction as indicted by the arrow, which will actuate the switch 50 and indicate the presence of an article engaging the fingers 29.

When the transfer mechanism 29, 39 is not needed, the transfer fingers 29 are rotated in the clockwise direction about the pivot pin 32 from either the horizontal position of FIG. 3 or the inclined position of FIG. 4A to a generally vertical position, and then lowered to where the pin 32 engages in the uppermost portion of the slot 31; at the same time, the recess 50 (shown most clearly in FIG. 3) will engage the stationary pin 51 that is stationarily fixed to a portion of the casing. In this position, the transfer fingers 29 are completely removed from the path of travel of both the shelves 6 and any articles that would normally be carried by the shelves 6.

OPERATION

Figure 7:
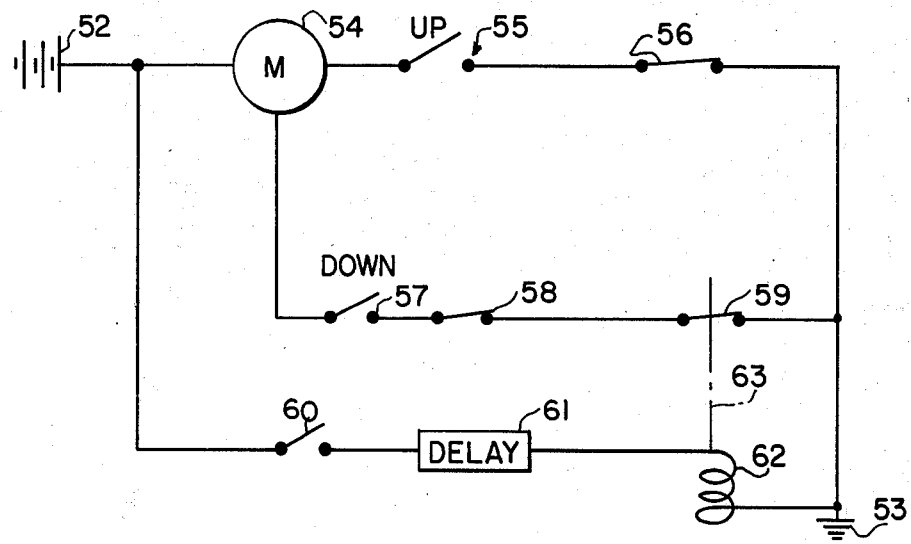
FIG. 7 is an electrical schematic showing the controls associated with the foregoing FIGS.

The operation will be described along with the electrical schematic of the controls as shown in FIG. 7.

When it is desired to place an article on a shelf for conveying upwardly, the transfer fingers 29 are manually pivoted from either their position of FIG. 4A or the position of FIG. 5 to the horizontal position of FIG. 3, with it being noted that to release the lock position of FIG. 5, it is first necessary to lift the transfer fingers to disengage the pin and slot connection 51, 50, and when moving from the position of FIG. 4A, it is first necessary to pivot the transfer fingers 29 clockwise about the pivot pin 32, move them forwardly through the lost motion pin and slot connection 32, 31 to where the plate 29' pivotally clears the pin 38, and then pivot the transfer fingers 29 counterclockwise. An article may be automatically, machanically, or manually placed on the horizontally extending transfer fingers in their position of FIG. 3. to start the conveyor, electricity from a suitable power source 52 is fed to the conveyor drive motor 54 by pressing the up switch 55 to provide a circuit through the closed switch 56 to the ground 53. When the conveyor shelf fingers 57 move upwardly past the transfer fingers 29 as shown in FIG. 6, the article will be lifted from the transfer fingers 29 so that its weight will thereafter be supported by the upwardly moving shelf fingers 7. If the article was placed on the transfer fingers 29 improperly so that the article was too far forward where it would interfere with the casing structure adjacent the upper portion of the opening 4, the upper forward end of the article would first strike the cable 10 before any casing structure. Thus, the cable 10 would be deflected to lift the weight 20 and actuate the switch 27, which switch and actuating structure is generally shown as switch 56 in FIG. 7. Thus, the article striking the cable 10 would open a normally closed switch 56 and stop the motor 54 with an improperly transferred article to prevent jamming of the article between the upwardly moving conveyor shelf 6 and structure 3 or 9 of the casing, with clearance being provided for over travel due to the inertia of moving conveyor after the motor has been deenergized by opening the switch 56.

If the transfer fingers 29 were in their horizontal position of FIG. 3, with or without an article carried thereby, and an article carried by a shelf below the transfer mechanism 29, 30 were moved upwardly into contact with the lower portion of the transfer fingers 29, the transfer fingers 29 would freely pivot about the pivot pin 32, with ample clearance between the control plate 29' and pin 38, to move the transfer fingers towards the vertical clear position of FIG. 5, without any jamming or injury of the article.

If an article was placed upon the transfer fingers 29 in the position of FIG. 3, and if the conveyor could be moved downwardly, it is seen that the article would be jammed between a downwardly moving shelf and the transfer mechanism, but this is prevented by the circuit of FIG. 7 and the previously described structure. In this position, pressing of the down switch 57 to close it will not energize the motor, because the switch 58, which is normally closed, would be opened by the horizontal position of the transfer fingers. The switch 58 represents the structure of FIG. 3 including the switch actuating arm 36, switch 37 and lower cam portion of the rearward end 35 of the control plate 29'.

When it is desired to remove an article from the downwardly moving conveyor, the trasfer arms 29 are locked by means of pin 38 and pin 32 in their position shown in FIG. 4A, and the switch 57 is closed to energize the conveyor motor and move the conveyor down. When the downwardly moving article strikes the transfer fingers 29 with movement of the shelf 6 past the transfer mechanism, the shelf 29 will pivot in the direction of the arrow shown in FIG. 4B about the pivot pin 32 to cause its plate 29' through engagement with the pin 38 to pivot the member 39 and the arm 41 about the pivot pin 40 against the bias of the spring 42 in the counterclockwise direction of the arrow as shown, which in turn will pivot the actuating arm 49 of the switch 50 in a clockwise direction and close the switch 60 of FIG. 7. As the conveyor shelf 6 becomes disengaged from the article, the article will normally slide down the inclined transfer fingers 29 through the transfer opening 4 of FIG. 1 for removal from the conveyor system, but if for some reason, such as a jammed adjacent conveyor, the article is not removed from the inclined transfer fingers 29, there will be the danger that the next shelf moving downward will strike the article and jam the conveyor. This is prevented by the present invention in that closure of the switch 60 indicating the presence of an article on the inclined transfer fingers will start a time delay 61, which delay is sufficient for the normal removal of the article from the conveyor; but if the article remains on the transfer fingers 29 for a longer time than the delay period, the coil 62 will be energized to open the switch 59 through the machanical relay connection 63 and thus deenergize the motor 54 before the next shelf 6 can strike the article that has remained too long on the inclined transfer fingers 29.

While a preferred embodiment of the present invention has been described in detail, which details are important in their own right, modifications, variations and further embodiments are contemplated according to the broader aspects of the present invention, all as defined by the spirit and scope of the following claims.

What is claimed is:

1. In a material handling conveyor, having a plurality of generally horizontal article carrying shelves selectively driven by an electric motor upwardly or downwardly within a casing between vertically spaced load transferring stations at least one of which has an opening extending generally in a vertical plane in one side of the casing providing access for loading and unloading of articles with respect to the conveyor shelves; the improvement being in safety control means for sensing an article that has been improperly transferred and for further stopping the conveyor before the misplaced article can cause material damage, which control mechanism comprises:

a cable; means mounting at least a portion of said cable to extend horizontally, parallel with said opening vertical plane, between opposite sides of said casing, adjacent and inwardly of the upper portion of said opening, and positioned so as to be outwardly of the vertical path of movement of said shelves, out of the normal path of movement of an article being carried by said shelves and in the path of movement of an article improperly transferred to said shelves; electrical switch means responsive to deflection of said cable portion when struck by an improperly transferred article for deactivating said electrical motor and thus stopping the driving of said shelves to prevent jamming of an article between an upwardly moving shelf and the conveyor casing; said mounting means fixedly securing one terminal end of said cable portion to said casing at one of said opposite sides; said mounting means at the other end of said horizontal cable portion, changing the cable direction from vertical to horizontal for the remainder of said cable at the other of said opposite sides; means biasing the vertically extending opposite terminal end of said cable for pulling the horizontal portion of said cable; said switch means being responsive to vertical movement of said opposite terminal end of said cable; and said mounting means including a vertically elongated rod secured at its upper end to said opposite terminal end of said cable, guide means secured to said casing and guiding the upper and lower ends of said elongated rod for controlled vertical movement in response to deflection of said horizontal portion of said cable, and a weight secured to said rod means for movement therewith between said guide means.

2. The apparatus of claim 1, wherein said switch means is secured to said casing and has a switch actuating lever within the path of travel of said weight during deflection of said horizontal cable portion.

3. The apparatus of claim 2, wherein said mounting means includes a shaft secured at one end to said on terminal end of said cable and threadably secured at its opposite end to said casing for adjusting the position of said cable at said one terminal end with respect to said casing along the direction of the length of the horizontal portion of said cable for correspondingly adjusting the relative positioning of said weight and switch means.

4. In a material handling conveyor, having a plurality of generally horizontal article carrying shelves selectively driven by an electric motor upwardly or downwardly between vertically spaced load transferring stations, with each of said shelves comprising a plurality of parallel and horizontally extending shelf fingers rigidly interconnected at the end opposite from an adjacent load transferring station and being cantilevered towards said load transferring station, and a load transfer mechanism at the load transferring station, the improvement being in the load transfer mechanism and safety control mechanism for sensing an article that has been improperly transferred and for further stopping the conveyor before the improperly transferred article can cause material damage, which improvement comprises:

said load transfer mechanism including, a plurality of parallel, horizontally extending rigid transfer fingers, rigidly interconnected at the end adjacent said load transferring station and being cantilevered inwardly toward said shelves to opposite free ends away from said load transferring station; the fingers of said load transfer mechanism and the fingers of each of said shelves being horizontally offset so that they will interdigitate with vertical movement of each coneyor shelf past the load transferring station and load transfer mechanism; said load transfer mechanism having means for mounting said transfer figers for pivotal movement about a horizontal axis adjacent load transferring station end of said transfer fingers; means for securing said transfer fingers in a generally horizontal position; horizontal position switch means being operated only when said transfer fingers are in their horizontal position; and circuit means having a down control switch in series with said horizontal position switch means for providing electrical power to said motor for downward movement of the conveyor shelves only when said down control switch is closed and further only when said horizontal position switch means is not operated corresponding to the horizontal position of said transfer fingers.

5. The apparatus of claim 4, wherein said load transfer mechanism further includes means for holding said transfer fingers in said horizontal position, and further means for selectively holding said transfer fingers in a position pivoted upwardly from said horizontal position, including a recess on one of said casing and said transfer fingers and a pin on the other, and means mounting said transfer fingers for limited lost motion radially of said pivot axis for radially moving and pivoting said transfer fingers to engage and disengage said recess and pin for engaging and releasing said transfer fingers in said upwardly pivoted position.

6. The apparatus of claim 5, wherein said upwardly pivoted position is a generally vertical position completely removing said transfer fingers from the path of travel of said shelves and articles normally carried by said shelves between said transferring stations; said holding means disengaging said pin and recess by permitting vertical lifting of said transfer fingers with radial lost motion with respect to said pivot axis to free said transfer fingers for downward pivoting to said horizontal position.

7. The apparatus of claim 5, wherein said holding means holds said transfer fingers rigidly in an inclined position between said horizontal position and a vertical position so as to be in the path of travel of said shelves for engaging the bottom of a downwardly traveling article carried by a shelf moving past said transfer mechanism to move said article along said inclined transfer fingers towards said transfer station.

8. The apparatus of claim 7, wherein said holding means provides for a small limited pivotal movement of said load transfer fingers in said inclined positions, between two closely adjacent inclined positions; means biasing the load transfer fingers to the upper one of said inclined positions and being overcomed by the transfer of an article from a conveyor shelf onto said load transfer fingers so that said load transfer fingers will pivot to the lower one of said inclined positions upon receiving and during transfer of an article during downward movement of said shelves past said load transfer mechanism; switch means sensing the movement of said load transfer fingers against said biasing means from said upper inclined position to said lower inclined position; circuit means having a down control switch and a safety switch in series with said motor for energizing said motor only when said down control switch and said safety switch are closed to move said shelves downwardly past said load transfer mechanism; means interconnecting said switch means with said safety switch for opening said safety switch only after a predetermined delay following the sensing of said load transfer fingers pivoting from said upper inclined position to said lower inclined position, which delay is sufficient for normally transferring articles from said inclined load transfer fingers to said transferring station.

9. The apparatus of claim 8, wherein said upwardly pivoted position is a generally vertical position completely removing said transfer fingers from the path of travel of said shelves and articles normally carried by said shelves between said transferring stations; said holding means disengaging said pin and recess by permitting vertical lifting of said transfer fingers with radial lost motion with respect to said pivot axis to free said transfer fingers for downward pivoting to said horizontal position.

10. The apparatus of claim 4, including a casing generally enclosing said article carrying shelves when moving between said spaced load transferring stations, and one of said load transferring stations having an opening extending generally in a vertical plane in one side of said casing providing access for loading and unloading of articles with respect to the conveyor shelves; a cable; means mounting at least a portion of said cable to extend horizontally, parallel with said opening vertical plane, between opposite sides of said casing, adjacent and inwardly of the upper portion of said opening, and positioned so as to be outwardly of the vertical path movement of said shelves, out of the normal path of movement of an article being carried by said shelves, and in the path of movement of an article improperly transferred to said shelves; and electric switch means responsive to deflection of said cable portion when struck by an improperly transferred article for deactivating said electric motor and thus stopping the driving of said shelves to prevent jamming of an article between an upwardly moving shelf and the conveyor casing.

11. The apparatus of claim 10, wherein said mounting means fixedly secures one terminal end of said cable portion to said casing at one of said opposite sides, at the other end of said cable portion changes the cable direction from horizontal to vertical for the remainder of said cable at the other of said opposite sides, and further biases the vertically extending opposite terminal end of said cable for pulling the horizontal portion of said cable; and said switch means being rsponsive to vertical movement of said opposite terminal end of said cable.

12. The apparatus of claim 10, wherein said mounting means includes a shaft secured at one end to one end of said cable portion and threadably secured at its opposite end to said casing for adjusting the position of said cable at said one end with respect to said casing along the direction of the length of the horizontal portion of said cable for correspondingly adjusting the relative positioning of said cable and switch means.

13. In a material handling conveyor, having a plurality of generally horizontal article carrying shelves selectively driven by an electric motor upwardly or downwardly between vertically spaced load transferring stations, with each of said shelves comprising a plurality of parallel and horizontally extending shelf fingers rigidly interconnected at the end opposite from an adjacent load transferring station and being cantilevered towards said load transferring station, and a load transfer mechanism at the load transferring station, the improvement being in the load transfer mechanism and safety control mechanism for sensing an article that has been improperly transferred and for further stopping the conveyor before the improperly transferred article can cause material damage, which improvement comprises:

said load transfer mechanism including, a plurality of parallel, horizontally extending rigidly interconnected at the end adjacent said load transferring station and being cantilevered inwardly toward said shelves to opposite free ends away from said load transferring station; the fingers of said load transfer mechanism and the fingers of each of said shelves being horizontally offset so that they will interdigitate with vertical movement of each conveyor shelf past the load transferring station and load transfer mechanism; said load transfer mechanism having means for mounting said transfer fingers for pivotal movement about a horizontal axis adjacent the load transferring station end of said transfer fingers; means for maintaining said transfer fingers in a pivoted position between the horizontal and vertical, and inclined towards said load transferring station so that articles carried downwardly by said shelves will strike said inclined transfer fingers and move towards said transferring station by gravity; means limiting pivotal movement of said transfer fingers in said inclined position, between two closely adjacent inclined positions; means biasing said transfer fingers to the upper one of said inclined positons and being overcome by the transfer of an article from a conveyor shelf onto said transfer fingers so that said transfer fingers will pivot to the lower one of said inclined positions upon receiving and during transfer of an article; switch means sensing the movement of said transfer fingers against said biasing means from said upper inclined position to said lower inclined positions; circuit means having a down control switch and a safety switch in series with said motor for energizing said motor only when said down control switch and said safety switch are closed to move said shelves downwardly past said load transfer mechanism; means inerconnecting said switch means with said safety switch for opening said safety switch only after a predetermined delay following the sensing of said transfer fingers pivoting from said upper inclined position to said lower inclined position, which delay is sufficient for properly transferring articles from said inclined transfer fingers to said transferring station.

14. The apparatus of claim 13, wherein said means for mounting said transfer fingers in said inclined positions includes a recess on one of said casing and said transfer fingers and a pin on the other, and means for mounting said transfer fingers for limited lost motion radially of said pivot axis, so that said transfer fingers may be pivotally and radially moved to disengage said pin and recess for permitting either upward or downward free pivoting movement of said transfer fingers from said inclined positions; said means limiting pivotal movement of said transfer fingers including a member movably mounted on said casing and having rigidly mounted thereon one of said recess and pin; said biasing means including a spring biasing said member upwardly with respect to said casing.

15. The apparatus of claim 14, further including pin and recess means carried by said transfer fingers and casing for engagement when said transfer fingers are in a pivoted vertical position removed from the path of travel of said shelves and articles carried by said shelves moving past said transfer mechanism, and permitting disengagement with radial lost motion upward movement of said transfer fingers and subsequent downward pivoting movement of said transfer fingers toward said inclined positions.

16. The apparatus of claim 13, further including means for securing said transfer fingers in a generally horizontal position; horizontal position switch means being operated only when said transfer fingers are in their horizontal position; and circuit means having a down control switch in series with said horizontal position switch means for providing electric power to said motor for downwardly movement of the conveyor shelves only when said down control switch is closed and further only when said horizontal position switch means is operated corresponding to the horizontal position of the transfer fingers.

17. The apparatus of claim 16, including a casing generally enclosing said article carrying shelves when moving between said spaced load transferring stations, and one of said load transferring stations having an opening extending generally in a vertical plane in one side of said casing providing access for loading and unloading of articles with respect to the conveyor shelves; a cable; means mounting at least a portion of said cable to extend horizontally, parallel with said opening vertical plane, between opposite sides of said casing, adjacent and inwardly of the upper portion of said opening, and position so as to be outwardly of the vertical path movement of said shelves, out of the normal path of movement of an article being carried by said shelves, and in the path of movement of an article improperly transferred to said shelves; and electric switch means responsive to deflection of said cable portion when struck by an improperly transferred article for deactivating said electric motor and thus stopping the driving of said shelves to prevent jamming of an article between an upwardly moving shelf and the conveyor casing.

18. The apparatus of claim 17, wherein said mounting means fixedly secures one terminal end of said cable portion to said casing at one of said opposite sides, at the other of said cable portion changes the cable direction from horizontal to vertical for the remainder of said cable at the other of said opposite sides, and further biases the vertically extending opposite terminal end of said cable for pulling the horizontal portion of said cable; and said switch means being responsive to vertical movement of said opposite terminal end of said cable.

19. The apparatus of claim 17, wherein said mounting means includes a shaft secured at one end to one end of said cable portion and threadably secured at its opposite end to said casing for adjusting the position of said cable at said one end with respect to said casing along the direction of the length of the horizontal portion of said cable for correspondingly adjusting the relative positioning of said cable and switch means.

20. In a material handling conveyor, having a plurality of generally horizontal article carrying shelves selectively driven by an electric motor upwardly or downwardly between vetically spaced load transferring stations, with each of said shelves comprising a plurality of parallel and horizontally extending shelf fingers rigidly interconnected at the end opposite from an adjacent load transferring station and being cantilevered towards said load transferring station, the improvement comprising a load transfer mechanism at the load transferring station, including:
  a plurality of parallel, horizontally extending rigid transfer fingers, rigidly inerconnected at the end adjacent said load transferring station and being cantilevered inwardly toward said shelves to opposite free ends away from said load transferring station; the transfer fingers of said load transfer mechanism and the shelf fingers of each of said shelves being horizontally offset so that they will interdigitate with vertical movement of each conveyor shelf past the load transfer mechanism; said load transfer mechanism having means for mounting said transfer fingers for pivotal movement about a horizontal axis adjacent the load transferring station end of said transfer fingers; means for selectively holding said transfer fingers in a plurality of pivoted positions, including a recess on one of said casing and said transfer fingers and a pin on the other, means mounting said transfer fingers for limited lost motion radially of said pivot axis, for radially moving and pivoting said transfer fingers to engage and disengage said recess and pin for correspondingly securing and releasing said transfer fingers in a pivoted position.

21. The apparatus of claim 20, including means separate from said holding means for securing said transfer fingers in a horizontal position within the path of travel of said shelves between said transferring stations for holding an article to be picked up and transferred to said shelves during upward movement of said shelves.

22. The apparatus of claim 21, wherein said pivoted position having said recess and pin engaged is an inclined position between said horizontal position and a vertical plane within the path of travel of said shelves past said load transfer mechanism so that downwardly moving articles carried by said shelves will engage said inclined transfer fingers in the inclined position to be removed from said shelves and move down the inclined transfer fingers by gravity towards the adjacent transferring station.

23. The apparatus of claim 22, including pin and recess means separate from said pin and said recess for engaging and holding said transfer fingers in a pivoted vertical position removed from the path of travel of said shelves past said load transfer mechanism and from the path of travel of articles carried thereby for storage of said transfer fingers, and permitting disengagement of said transfer fingers by upward radial lost motion of said transfer fingers with respect to said pivot axis for downward pivoting of said fingers to said inclined position and said horizontal position.

24. The apparatus of claim 21, including pin and recess means separate from said pin and said recess for engaging and holding said transfer fingers in a pivoted vertical position removed from the path of travel of said shelves past said load transfer mechanism and from the path of travel of articles carried thereby for storage of said transfer fingers, and permitting disengagement of said transfer fingers by upward radial lost motion of said transfer fingers with with respect to said pivot axis for downward pivoting of said fingers to said horizontal position.

25. The apparatus of claim 20, wherein said pivoted position having said recess and pin engaged is an inclined position between said horizontal position and a vertical plane within the path of travel of said shelves past said load transfer mechanism so that downwardly moving articles carried by said shelves will engage said inclined transfer fingers in the inclined position to be removed from said shelves and move down the inclined transfer fingers by gravity towards the adjacent transferring station.

26. The apparatus of claim 25, including pin and recess means separate from said pin and said recess for engaging and holding said transfer fingers in a pivoted vertical position removed from the path of travel of said shelves past said load transfer mechanism and from the path of travel of articles carried thereby for storage of said transfer fingers, and permitting disengagement of said transfer fingers by upward radial lost motion of said transfer fingers with respect to said pivot axis for downward pivoting of said shelves to said inclined position and said horizontal position 27. The apparatus of claim 20, including pin and recess means separate from said pin and recess for engaging and holding said transfer fingers in a pivoted vertical position removed from the path of travel of said shelves past said load transfer mechanism and from the path of travel of articles carried thereby for storage of said transfer fingers, and permitting disengagement of said transfer fingers by upward radial lost motion of said transfer fingers with respect to said pivot axis for downward pivoting of said fingers to said inclined position and said horizontal position.

28. In a material handling conveyor, having a plurality of generally horizontal article carrying shelves selectively driven by an electric motor upwardly or downwardly between vertically spaced load transferring stations along a conveying path relative to a relatively stationary support structure, the improvement being in a safety control mechanism for sensing an impending jam of a shelf striking a part of the support structure or an object carried by a shelf striking part of the support structure, and for further stopping the conveyor before the jam can cause material damage, which improvement comprises:

said safety control mechanism including a control arm mounted for pivotal movement about a horizontal axis that is removed from the conveying path of travel of said shelves; means for maintaining said arm in a pivoted sensing position in the conveying path of travel of said shelves; means limiting pivotal movement of said arm in said sensing position, between at least two closely adjacent sensing pivoted positions; means biasing said arm to one of said sensing positions and being overcome by a jam involving a conveyor shelf movement so that said arm will pivot to the other of said sensing positions; switch means sensing the pivoting of said arm against said biasing means from said on position to said other position and thereby stopping said conveyor and stopping movement of said shelves along said conveying path; a recess in on said support structure and said arm, and a pin in the otherof said support structure and said arm; means mounting said arm for limited lost motion radially of said pivot axis, for permitting radial moving said pivoting of said arm relative to said pivot axis to engage and disengage said recess and pin for correspondingly securing and releasing said arm in a pivoted position.

29. The apparatus of claim 28, wherein said pivoted position having said recess and pin engaged is said sensing position within the conveying path of travel of said shelves.

30. The apparatus of claim 28, wherein pivoted position having said recess and pin engaged is a position separate from said sensing position for engaging and holding said arm in a vertical position removed from the path of travel of said shelves and from the path of travel of articles carried thereby for storage of said arm, and permitting disengagement of said pin and recess by upward radial lost motion movement of said arm with respect to said pivot axis and subsequent downward pivoting of said arm to said sensing position.

* * * * *